United States Patent [19]
Ziegler

[11] 3,815,303
[45] June 11, 1974

[54] PROFILE STRIP FOR THE MOUNTING SUPPORT OF FIXEDLY INSTALLED PANES

[75] Inventor: Hermann Ziegler, Renningen, Germany

[73] Assignee: Dr. Ing. h.e.F. Porsche KG, Stuttgart-Zuffenhausen, Germany

[22] Filed: Apr. 21, 1972

[21] Appl. No.: 246,180

[30] Foreign Application Priority Data
Apr. 22, 1971 Germany............................ 2119617

[52] U.S. Cl................................... 52/99, 52/400
[51] Int. Cl................................................ E06b 3/62
[58] Field of Search.......................... 52/397–400, 52/393, 99

[56] References Cited
UNITED STATES PATENTS

| | | | |
|---|---|---|---|
| 2,456,175 | 12/1948 | Coppock et al. | 52/400 |
| 2,610,713 | 9/1952 | Bradley | 52/400 |
| 2,954,310 | 9/1960 | Truesdell et al. | 52/400 X |
| 2,961,803 | 11/1960 | Shapiro et al. | 52/393 X |
| 3,150,421 | 9/1964 | Lickert | 52/400 X |

FOREIGN PATENTS OR APPLICATIONS

| | | | |
|---|---|---|---|
| 868,258 | 2/1953 | Germany | 52/400 |

*Primary Examiner*—Alfred C. Perham
*Attorney, Agent, or Firm*—Craig & Antonelli

[57] ABSTRACT

A profile strip serving for the mounting support of fixedly installed panes, especially of windshield panes in motor vehicles, which is provided with two mutually oppositely directed, mutually offset grooves for accommodating the edge of the pane and the edge flange of the frame for the pane; inherently rigid clamp-like mounting brackets are thereby embedded in an elastic profile body which overlap the grooves and which interengage hook-like in a joint-point to permit bending of the profile body about this joint-point during the installation.

34 Claims, 4 Drawing Figures

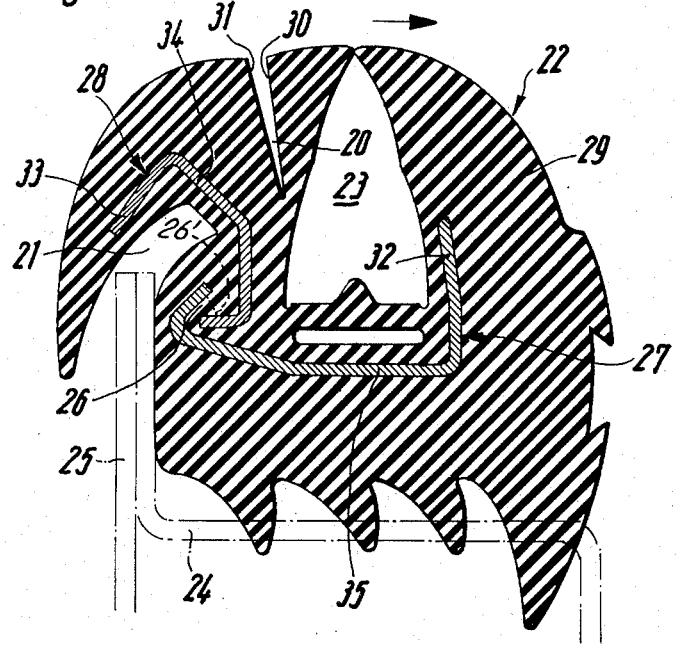
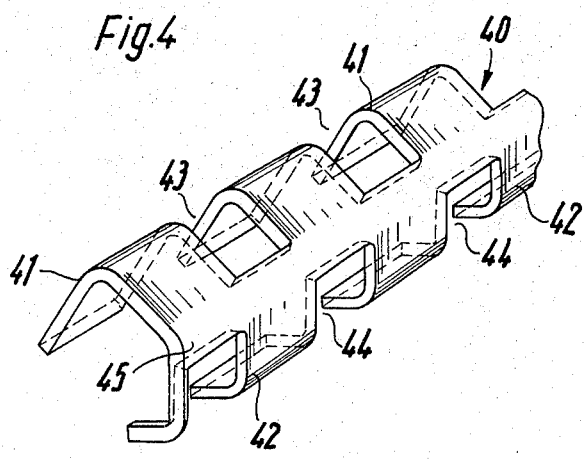

PROFILE STRIP FOR THE MOUNTING SUPPORT OF FIXEDLY INSTALLED PANES

The present invention relates to a profile strip serving for the mounting support of fixedly installed panes, especially windshield panes in motor vehicles, which is provided with two mutually oppositely directed and mutually offset grooves for receiving the pane edge and the edge flange of the frame for the pane.

The aim of the present invention is the increase of the passive safety in motor vehicles.

For this purpose, one requires according to more recent findings in motor vehicles the fixed installation of the windshield pane in order to prevent during an impact that the pane can be torn out of the frame in its entirety and without destruction. This requirement is tied to the developments of belt systems, "air bags" and similar installations with the aim to prevent that the passengers are thrown out of the passenger space.

In part, the motor vehicle manufacturers have therefore already gone over to securely fix the immovably installed panes, especially the windshield panes by means of a gluing method (see German Offenlegungsschrift 2,026,098-63c 58/01). These gluing or bonding methods, however, entail various disadvantages.

With panes fixed securely in such a manner, the danger of breakage as a result of unavoidable warpings or distortions of the pane frame is very much greater than with the heretofore customary mode of installation (a pane floatingly supported in a rubber profile). A disassembly of the pane is possible only by the destruction for the most part of the sealing elements as well as of the pane. Already during the manufacture in the plant, this disassembly operation is very frequent and cannot be avoided; for panes, for example, with scratches or optical errors, inter alia, have to be exchanged. With glued-in panes, however, this is realizable only with an enormous expenditure in time. Furthermore, great care has to be exercised also during the installation. The gluing places (pane wall) have to be cleaned and degreased completely satisfactorily as otherwise the adherence is not assured.

In order to avoid these disadvantages of the gluing methods, fulfilling as such the safety requirements, it has already been proposed with the preservation of the tested floating support in the rubber profile, to arrange on both sides of the groove provided for the pane one slot each for the accommodation of one leg each of an angularly shaped sheet metal profile or section and to secure the sheet metal section itself at the body pane frame by means of fastening screws (German Offenlegungsschrift 1,938,413 - 63c 44). However, it is very disadvantageous with this solution that the sheet metal profile or section has to be screwed-on at the pane frame in an uneconomical manner for the mass production. Furthermore, for purely optical reasons, in order to cover profile and fastening screws, an additional cover strip has to be provided.

The present invention is concerned with the task to create a profile strip for the mounting support of fixedly installed panes, especially of windshield panes in motor vehicles, which assures a simple and rapid assembly and disassembly and at the same time withstands the highest requirements as regards the fastening in the pane or window frame. Such a profile strip should assure that, for example, a windshield pane is not torn out of the frame of the pane by reason of the inertia also without an impact from the inside either during a total braking operation or in the case of an impact.

According to the present invention, the underlying problems are solved with a profile strip having two mutually oppositely directed and mutually offset grooves for the accommodation of the pane edge and of the edge flange of the frame of the pane, in that clamp-like mounting brackets overlapping the grooves and inherently rigid are embedded in an elastic profile body, which inter-engage hook-like in a joint-point, and in that the profile body is bendable about this joint-point for the assembly.

A first mounting bracket may be formed and shaped for the overlap of the mounting groove for the pane edge and a second mounting bracket may be formed and shaped for the overlap of the mounting groove for the edge flange of the pane frame. One leg each of the two mounting brackets can be constructed as hook for the interengagement in the joint-point, whose inner sides are disposed approximately parallel to one another in the assembled position of the profile strip and are disposed at such an angle to the surface of the pane that in the loaded condition of the pane a sliding movement of the hooks, one into the other, is effected. A second leg of the first mounting bracket is to overlap relatively far the mounting groove for the pane edge and is to be bent over the pane in its end portion. Similarly, the second leg of the second mounting bracket is to overlap relatively far the mounting groove for the edge flange of the pane frame and is to be bent off toward the same. The joint-point formed by the hook-like interlocking engagement of the mounting brackets is to be arranged outside of the effective lines of force transmitted in the load condition from the pane to the profile strip. During an impact by reason of its mass and by reason of the deceleration of the impinging vehicle (and therewith of the window or pane frame rigidly connected with the vehicle) the pane has the tendency to detach or loosen itself from its mounting support. The forces resulting therefrom act by way of the pane edge retained in the profile strip onto the profile body and the mounting brackets. Since the mounting bracket overlapping the pane edge is securely fixed in the profile body by reason of its position, it is to be prevented by the location of the joint-point that the mounting bracket surrounding the edge flange can shift and deflect. By the arrangement of the joint-point outside of the effective lines of force, this mounting bracket will have the tendency in the loaded condition to rotate out of the joint-point. However, the secure-gripping or clawing effect at the edge flange is reinforced thereby and the position is thus stabilized.

For the purpose of installing the pane into the window or pane frame of the body, the profile body should have a hollow space or recess between the mounting grooves which enables a facilitation of the bending of the profile body about the joint-point.

The clamp-like mounting brackets embedded in the profile body can be constructed as continuous bars extending over the entire pane circumference or over a part thereof. However, since for the installation and disassembly of the pane the elasticity of the profile strip and its twisting ability in the longitudinal direction should not be particularly impaired by the mounting brackets, recesses or apertures arranged offset in the longitudinal direction may be provided in the leg portions of the mounting brackets, which are extended up to a relatively narrow back web. However, the mounting brackets can also be embedded in the profile body as relatively short bracket sections with mutual spacings. The mounting brackets may be manufactured in one piece with a connecting place at the hooks that breaks in case of bending so that with a manufacturing process in which the strip material of the profile body is formed or molded about the mounting brackets in the assembly position, the accurate arrangement of the brackets relative to one another is assured in a simple manner.

It is of particular advantage that by means of the profile strip according to the present invention, the installation of the pane can be carried out in the heretofore generally customary simple and tested manner by the insertion of a circumferential cord into the groove for the mounting of the edge flange of the window or pane frame and by tearing-in with the aid of this cord, i.e., without additional fastening means such as screws or similar devices and without glue or bonding material, and that the secure seating of the pane in the window frame is assured thereby also in case of an impact of the vehicle.

A simple disassembly is also made possible by the construction according to the present invention, and it is further assured that each workshop is readily able to undertake the removal and installation. Additionally, in contradistinction to the gluing or bonding process, distortions and warpings of the vehicle body can be absorbed up to a certain degree by the profile body.

These and other objects, features, and advantages of the present invention will become more apparent from the following description when taken in connection with the accompanying drawing which shows, for purposes of illustration only, two embodiments in accordance with the present invention, and wherein:

FIG. 3 is a partial cross-sectional view through a second embodiment of a profile strip according to the present invention illustrated in the condition bent-open for the installation; and FIG. 4 is a perspective view of an individual clamp-like mounting bracket with recesses for the increase of the elasticity.

Figure 1:
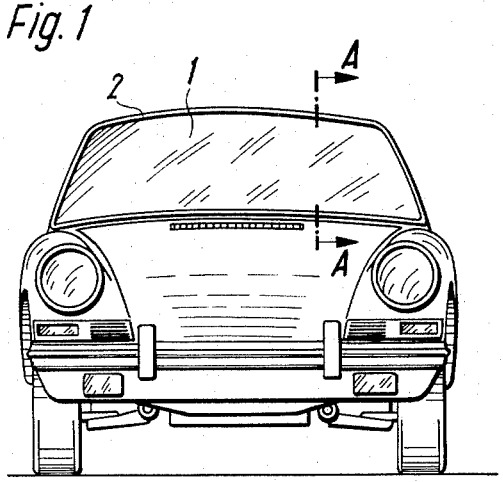
FIG. 1 is a front elevational view of a passenger motor vehicle provided with a windshield mounting support in accordance with the present invention.
Figure 2:
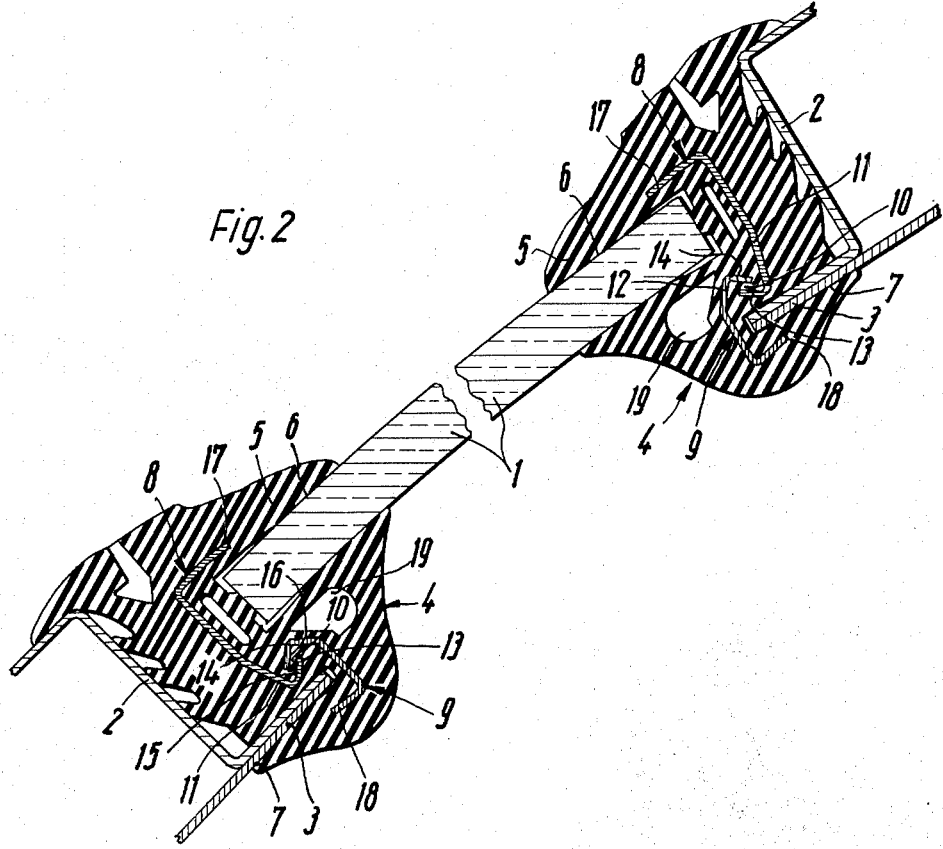
FIG. 2 is a cross-sectional view on an enlarged scale, taken along line A—A of FIG. 1 through a windshield pane installed in a passenger motor vehicle by means of a profile strip according to the present invention.

Referring now to the drawing wherein like reference numerals are used throughout the various views to designate like parts, and more particularly to FIGS. 1 and 2, reference numeral 1 designates in these figures a windshield pane of a passenger motor vehicle. This windshield pane 1 is installed into a corresponding windshield frame 2 formed in the body of the passenger motor vehicle. A peripheral edge flange 3 is formed in a manner known as such as termination of the pane frame 2 against the windshield opening. A profile strip generally designated by reference numeral 4 serving for the mounting support of the windshield pane 1 and for the sealing is retained at this edge flange 3. The profile strip 4 is made of an elastic profile body 5 having two mutually oppositely directed and mutually offset grooves 6 and 7 for receiving the rim edge of the pane 1 and the edge flange 3 of the pane frame 2, respectively, of a first clamp-like mounting bracket generally designated by reference numeral 8 embedded in the profile body 5 and overlapping the mounting groove 6 for the pane and of a second clamp-like mounting bracket generally designated by reference numeral 9 also embedded in the profile body 5 and overlapping the mounting groove 7 for the edge flange 3 of the pane frame. The mounting brackets 8 and 9 are made of metal or of plastic material of any conventional type. They interengage in a joint-point 10 whereby a leg portion 11 of the mounting bracket 8 and a leg portion 12 of the mounting bracket 9 are constructed as hooks 13 and 14, respectively, for the interengagement in the joint-point 10. The inner sides 15 and 16 of the hooks 13 and 14 are disposed approximately parallel to one another in the assembled position of the profile strip 4. They are at such an angle to the pane 1 that in the load condition of the pane (for example during braking or in case of an impact), a sliding of the hooks 13 and 14, one into the other, is effected.

A second leg portion 17 of the mounting bracket 8 surrounds relatively far the mounting groove 6 for the pane 1 and is bent off in its end section toward the pane. Similarly, a second leg portion 18 surrounds relatively far the mounting groove 7 for the edge flange 3 and is bent off toward the same.

In the elastic profile body 5 which may be made of rubber, a hollow space 19 is provided at a place between the mounting grooves 6 and 7, in order that the bending or flexing of the profile strip about the joint-point 10 is facilitated.

The mounting brackets 8 and 9 can be constructed as continuous bars extending over the entire circumference of the pane or over a part thereof—for example, only over the upper and lower edge thereof. In that case, as illustrated in FIG. 4, recesses 43 and 44 arranged offset in the longitudinal direction are provided in the leg portions 41 and 42 of the clamp-like mounting bracket generally designated by reference numeral 40, which extend up to a relatively narrow back web 45. As a result thereof, the elasticity and torsional ability in the longitudinal axis of the profile strip, required for the disassembly and installation of the windshield pane, are not impaired by the mounting brackets in a form unfavorable for the assembly. The mounting brackets 8 and 9, however, may also be embedded in the profile body 5 as relatively short bracket sections with mutual spacings.

In FIG. 3, a slightly modified embodiment of a profile strip according to the present invention is illustrated. The changes compared to the previously described embodiment reside, however, only in that in lieu of a hollow space 19, a recess 20 is provided in the embodiment of FIG. 3. An illustration is thereby selected which shows the profile strip in the not-installed condition but with a mounting groove 21 (corresponding to the groove 7 in FIG. 2) bent open for the installation.

The installation and function of the profile strip according to the present invention can be described as follows (by reference to FIG. 3):

At first, the profile strip generally designated by reference numeral 22 is placed with its groove 23 circumferentially over the entire windshield pane edge of a pane to be fixedly installed, for example, of the windshield pane of a motor vehicle. The pane with emplaced profile strip 22 is then introduced into the corresponding opening of the window or pane frame 24 and is drawn over the edge flange 25 of the window frame along a portion of the circumference by bending open the groove 21. This bending open operation is made possible by the interengaged mounting brackets 27, 28 hooked one into the other within the joint-point 26. The recess or aperture 20 provided in the rubber profile body 29 facilitates the bending open operation. It is so constructed that in the bent-open condition of the groove 21, the side edges 30 and 31 thereof just come into abutment against one another. A cord or the like is inserted into the groove 21 over the entire circumference. With the aid of this cord, the profile strip 22 is then torn over the edge flange 25 for the secure seating. Due to the elasticity of the rubber, the strip bent open for the installation assumes again its normal position (see installed position in FIG. 2).

If forces now act by way of the pane edge on the profile strip, for example, due to total braking or impact (see the arrow in FIG. 3 for the force direction), then these forces are transmitted by way of the mounting brackets 27 and 28 onto the edge flange 25.

The mounting bracket 27 cannot deflect by reason of its relatively fixed mounting within the profile body 29. Care must be taken by the determination of the joint-point 26 that also the mounting bracket 28 is not deflected when forces act thereon, in such a manner that it can disengage itself from its overlap position of the edge flange 25. This is realized in that one arranges the joint-point 26 outside of the effective lines of force transmitted from the pane edge to the profile strip 22. In the illustrated embodiments, the joint-points 10 and 26 are therefore located below the lowest place of the groove 6 and 23, respectively. As a result of this arrangement, the application of force of the mounting bracket 27 acts in the load condition on the mounting bracket 28 in the direction of the arrow within the joint-point 26 in such a manner that the latter (in the illustrated position) is to be rotated in the counterclockwise direction. As a result thereof, it hooks-in even more strongly behind the edge flange 25.

The leg portions 17 and 18 (FIG. 2) or 32 and 33 (FIG. 3) of the clamp-like mounting brackets 8 and 9 or 27 and 28 overlap the grooves for the pane edge and mounting flange relatively far. Viewed horizontally onto the window surface, the upper edge of the leg portions 32 of the mounting bracket 27 should in the assembled position be approximately at the same height with the web 34 of the mounting bracket 28 and the upper edge of the leg portion 33 of the mounting bracket 28 approximately at the same height with the web 35 of the mounting bracket 27.

The profile strip according to the present invention can be manufactured in a simple manner by a process in which the mounting brackets arranged in the assembled position can be surrounded with the injected or molded material of the profile body. This process can be simplified in that one provides at the hooks of the mounting brackets a connecting place which breaks easily in case of bending (FIG. 3 schematically depicts such a connecting place 26' in dash lines). The mounting brackets can thus be made in one piece and the exact position of the brackets to one another is completely satisfactorily assured when molding the material of the profile body about these brackets.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A profile strip serving for the mounting support of fixedly installed panes, especially of windshield panes in motor vehicles, which is provided with two mutually oppositely directed and mutually offset grooves for mounting a pane edge and an edge flange of a frame means for the pane, characterized in that mounting bracket means are embedded in an elastic profile body means, said mounting bracket means overlapping the grooves and interengaging hook-like in a joint-point, characterized in that the profile body means are bendable about said joint-point for the installation of the pane, characterized in that the mounting bracket means are inherently rigid, characterized in that a first of said mounting bracket means is formed for the overlap of the mounting groove for the edge of the pane and a second of said mounting bracket means is formed for the overlap of the mounting groove for the edge flange of the frame means and, characterized in that one leg portion of each mounting bracket means is constructed as hook for the interengagement in said joint-point, the inner sides of said hooks being approximately parallel in the installed position of the profile strip and being at such an angle to the surface of the pane that in the loaded condition of the pane a sliding of the hooks, one into the other, is effected.

2. A profile strip according to claim 1, characterized in that a second leg portion of the first mounting bracket means overlaps relatively far the mounting groove for the pane and is bent off in its end section toward the pane.

3. A profile strip according to claim 2, characterized in that a second leg portion of the second mounting bracket means overlaps relatively far the mounting groove for the edge flange of the frame means and is bent off toward the same.

4. A profile strip according to claim 3, characterized in that the joint-point constituted by the hook-like interengagement of the mounting bracket means is arranged outside of the effective lines of force transmitted in the loaded condition from the pane to the profile strip.

5. A profile strip according to claim 4, characterized in that the profile body means is provided with aperture means between the mounting grooves.

6. A profile strip according to claim 5, characterized in that the aperture means is a hollow space.

7. A profile strip according to claim 5, characterized in that the aperture means is a recess.

8. A profile strip for fixedly supporting a windshield pane at an edge flange of a windshield frame; said profile strip comprising:
an elastic profile body means,
a first groove means formed in said profile body means for clampingly engaging an edge portion of a windshield pane, a second groove means formed in said profile body means for clampingly engaging an edge flange of a windshield frame, a first relatively rigid reinforcing mounting bracket embedded in said profile body means in overlapping reinforcing relationship with respect to said first groove means, and a second relatively rigid reinforcing mounting bracket embedded in said profile body means in overlapping reinforcing relationship with respect to said second groove means, said first bracket including a first hook portion, said second bracket including a second hook portion, said first and second brackets being positioned in said profile body means with a surface of said first hook portion in facing relationship to a surface of said second hook portion such that forces on one of said brackets are transferred to the other of said brackets by way of said hook portions, said profile body means being substantially more flexible than either of said first and second bracket at least in the area of a joint-point adjacent said hook portions for accommodating bending of said profile body means about said joint-point with said brackets in their respective embedded positions during installation and removal of a windshield, characterized in that one leg portion of each bracket is constructed as said hook portion for the interengagement in said joint-point, the facing surfaces of said hook portions being approximately parallel in the installed position of the profile strip and being at such an angle to the surface of the pane that in the loaded condition of the pane a sliding of the hook portions, one into the other, is effected.

9. A profile strip serving for the mounting support of fixedly installed panes, especially of window panes in motor vehicles, which is provided with two mutually oppositely directed and mutually offset grooves for mounting a pane edge and an edge flange of a frame means for the pane, characterized in that mounting bracket means are imbedded in an elastic profile body means, said mounting bracket means overlapping the grooves and interengaging hook-like in a joint-point, and the profile body means being bendable about said joint-point for the installation of the pane, characterized in that the mounting bracket means are made in one piece with a connection at the hooks adapted to be broken in case of bending thereof.

10. A profile strip for fixedly supporting a windshield pane at an edge flange of a windshield frame; said profile strip comprising:

an elastic profile body means, a first groove means formed in said profile body means for clampingly engaging an edge portion of a windshield pane, a second groove means formed in said profile body means for clampingly engaging an edge flange of a windshield frame, a first relatively rigid reinforcing mounting bracket embedded in said profile body means in overlapping reinforcing relationship with respect to said first groove means, and a second relatively rigid reinforcing mounting bracket embedded in said profile body means in overlapping reinforcing relationship with respect to said second groove means, said first bracket including a first hook portion, said second bracket including a second hook portion, said first and second brackets being positioned in said profile body means with a hook surface of said first hook portion in facing relationship to a hook surface of said second hook portion, said hook surfaces being at such an angle with respect to one another and to said first groove means that forces acting on a windshield pane supported by said first groove means are transmitted between said first and second brackets by way of said hook surfaces on said first and second hook portions, wherein portions of said profile body means are interposed between the respective hook surfaces of said hook portions for accommodating bending of said profile means about a bending joint-point located between said facing surfaces with said brackets in their respective embedded positions during installation and removal of a windshield pane from said profile strip.

11. A profile strip according to claim 10, characterized in that a leg portion of the first bracket overlaps relatively far the first groove means and is bent off in its end section toward the pane.

12. A profile strip according to claim 10, characterized in that a leg portion of the second bracket overlaps relatively far the second groove means for the edge flange of the frame means and is bent off toward the same.

13. A profile strip according to claim 10, characterized in that the joint-point constituted by the hook-like interengagement of the mounting bracket means is arranged outside of the effective lines of force transmitted in the loaded condition from the pane to the profile strip.

14. A profile strip according to claim 10, characterized in that the profile body means is provided with aperture means between the groove means for facilitating bending of the profile body means and insertion of the pane and edge flange in the groove means.

15. A profile strip according to claim 14, characterized in that the aperture means is a hollow space.

16. A profile strip according to claim 14, characterized in that the aperture means is a recess.

17. A profile strip according to claim 10, characterized in that the brackets are constructed as continuous bars extending at least over a portion of the circumference of the pane.

18. A profile strip according to claim 17, characterized in that the brackets are constructed as continuous bars extending over the entire circumference of the pane.

19. A profile strip according to claim 10, characterized in that the brackets are embedded in the profile body means as relatively short bracket sections at mutual spacings.

20. A profile strip according to claim 10, characterized in that apertures are provided in leg portions of the brackets which are arranged mutually offset in the longitudinal direction and which extend up to a relatively narrow back web.

21. A profile strip according to claim 10, wherein said first and second groove means are oppositely facing and are mutually offset from one another.

22. A profile strip according to claim 21, wherein said joint-point is located outwardly of the bottom of said first groove means.

23. A profile strip according to claim 21, wherein said first bracket includes a leg portion extending adjacent one side of said first groove means, said hook portion of said first bracket being on the other side of said first groove means in facing relationship to said leg portion, and wherein said second bracket includes a leg portion extending adjacent one side of said edge flange, said hook portion of said second bracket being on the other side of said second groove means in facing relationship to said leg portion of said second bracket.

24. A profile strip according to claim 10, wherein said edge flange is a fixed part of an automotive vehicle windshield frame, and wherein said profile strip supports a windshield pane in said vehicle windshield frame.

25. A profile strip according to claim 10, wherein each of said brackets are spaced from said groove means and from exterior surfaces of said profile body means such that both said windshield pane and said edge flange are abuttingly engaged by portions of said profile body means.

26. A profile strip according to claim 25, characterized in that the brackets are constructed as continuous bars extending at least over a portion of the circumference of the pane.

27. A profile strip according to claim 26, characterized in that the brackets are constructed as continuous bars extending over the entire circumference of the pane.

28. A profile strip according to claim 26, characterized in that apertures are provided in leg portions of the brackets which are arranged mutually offset in the longitudinal direction and which extend up to a relatively narrow back web.

29. A profile strip according to claim 25, characterized in that the brackets are embedded in the profile body means as relatively short bracket sections at mutual spacings.

30. A profile strip according to claim 29, characterized in that apertures are provided in leg portions of the brackets which are arranged mutually offset in the longitudinal direction and which extend up to a relatively narrow back web.

31. A profile strip according to claim 30, characterized in that the brackets are made in one piece with a weakened connection at the hook portion adapted to be broken in case of bending thereof.

32. A profile strip according to claim 28, characterized in that the brackets are made in one piece with a weakened connection at the hooks portions adapted to be broken in case of bending thereof.

33. A profile strip according to claim 25, wherein said first and second groove means are oppositely facing and are mutually offset from one another.

34. A profile strip according to claim 33, wherein said joint-point is located outwardly of the bottom of said first groove means.

* * * * *